US006565440B2

(12) United States Patent
Hames

(10) Patent No.: US 6,565,440 B2
(45) Date of Patent: *May 20, 2003

(54) DEDICATED WIRELESS DIGITAL VIDEO DISC (DVD) CONTROLLER FOR VIDEO GAME CONSOLES

(75) Inventor: Edward L. Hames, Peterborough, NH (US)

(73) Assignee: Arista Enterprises Inc., Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/544,231

(22) Filed: Apr. 7, 2000

(65) Prior Publication Data

US 2003/0027633 A1 Feb. 6, 2003

(51) Int. Cl.[7] .......................... G06F 17/00; G06F 19/00
(52) U.S. Cl. ............................................ 463/39; 463/37
(58) Field of Search .............................. 463/37, 38, 39; 434/351

(56) References Cited

U.S. PATENT DOCUMENTS

| | | | |
|---|---|---|---|
| 4,531,740 A | * 7/1985 | Green et al. | 273/148 B |
| 5,410,326 A | * 4/1995 | Goldstein | 348/134 |
| 5,429,363 A | 7/1995 | Yokoto | |
| 5,605,505 A | 2/1997 | Han | |
| 5,806,849 A | 9/1998 | Rutkowski | |
| 5,969,774 A | 10/1999 | Wininger | |
| 6,213,880 B1 | * 4/2001 | Sim | 463/37 |
| 6,238,289 B1 | * 5/2001 | Sobota et al. | 463/39 |
| 6,280,327 B1 | * 8/2001 | Leifer et al. | 463/39 |
| 6,289,165 B1 | * 9/2001 | Abecassis | 386/46 |
| 6,380,978 B1 | * 4/2002 | Adams et al. | 348/452 |

OTHER PUBLICATIONS

Lawson, Stephen. "Infrared wireless LANs offer switched bandwidth." InfoWorld Electric. [Mar. 3, 1999]. Retrieved from the Internet on [Jan. 28, 2002]. URL<http://www.clarinetsys.com/site/press-p...page/ind-review-pages/reviews-page3.html>.*

* cited by examiner

Primary Examiner—Michael O'Neill
Assistant Examiner—Julie Kasick
(74) Attorney, Agent, or Firm—Keusey, Tutunjian & Bitetto, P.C.

(57) ABSTRACT

A wireless interface and dedicated digital video disc (DVD) controller for video game consoles capable of playing DVDs. An adapter is inserted into one of the game controller ports of the game console and provides a wireless communication receiver for receiving and inputting control commands into the game console. A dedicated DVD remote control device includes a wireless transmitter for wirelessly transmitting DVD player control functions to the game console via the adapter and thereby enables wireless control of the DVD functions of the game console. The control buttons on the dedicated DVD remote control correspond in function to the wired game controller buttons that would otherwise control the DVD functions of the game console, but have an appearance to the user that corresponds to a standard DVD player remote control. Thus, the user need not navigate through menus or otherwise determine the DVD player functions of the wired game controller buttons with symbol designations used for various functions of game play.

16 Claims, 3 Drawing Sheets

DEDICATED WIRELESS DIGITAL VIDEO DISC (DVD) CONTROLLER FOR VIDEO GAME CONSOLES

BACKGROUND OF THE INVENTION

1. Field of the Invention

The present invention relates to console video gaming systems, and more particularly, to a wireless digital video disc (DVD) controller and interface for console video gaming systems capable of playing DVDs.

2. Description of the Related Art

The new age of console video game systems now includes an additional feature of playing digital video discs (DVDs). "DVD" may also be used to describe digital versatile discs, which include digital video discs. This feature gives the console game system a dual function of playing video games and DVD's at the user's choice. Thus, the video game console capable of playing DVDs can now be integrated into a home entertainment system for more than just video game playing. One example of such console video game system is the Sony PLAYSTATION II® which is expected to be available in the U.S. retail market later this year. It is also believed that other manufacturers will incorporate this dual function ability in the near future.

The above example of a console video game system (Sony PLAYSTATION II®) includes two game controller ports for receiving two game controllers for use in operating the games. In addition, the DVD functions of the Sony PLAYSTATION II® are also controlled through the use of one of the two game controllers (e.g., controller No. 1). Various buttons on the game controller can be used to control various playing features of the DVD being viewed.

Generally, the game console with wired controllers is proximate to the television it is connected to. Thus, the primary drawback to the game console that can play DVDs is that the game controller must be plugged into the game console in order to control the DVD functions. Thus, the wired "remote" control (i.e., game controller) for the DVD functions of the game console is a significant limitation on the user's ability to sit back and enjoy a DVD without either having the game console with wired "remote" near the sitting area for viewing the television, or being required to get up each time a DVD player control function is desired. This is especially a drawback when the video game console is connected to, and is part of the user's audio/video entertainment system.

A wireless game controller such as that disclosed in U.S. Pat. No. 5,605,505 may be implemented to eliminate this problem of a wired controller, however, the button designations of the wireless game controller will not necessarily correspond with that of the wired controller for this system, nor will they correspond in function or position with the designated control functions of the DVD player. As such, the user is required to learn the game controller button symbols and/or letters that control the various functions of the DVD player of the device.

SUMMARY OF THE INVENTION

It is therefore an object of the invention to provide an accessory item that provides a wireless controller dedicated to control the DVD features of a video gaming console capable playing DVD discs.

It is another object of the invention to provide a dedicated wireless DVD controller for a video gaming console that doesn't require additional menus or button association by the user.

These and other objects are achieved in accordance with an embodiment of the present invention in which a wireless adapter (interface) receiver is insertable into one of the game controller ports of the game console and a dedicated DVD remote control transmitter having a plurality of DVD player function control buttons wirelessly transmits the selected DVD player control function to the wireless interface receiver. The wireless interface receiver inputs the received DVD player control functions to the game console via the connected game controller port and thereby enables remote wireless control of the DVD player functions of the game console.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals denote similar elements throughout the views.

DETAILED DESCRIPTION OF PREFERRED EMBODIMENTS

Figure 1:
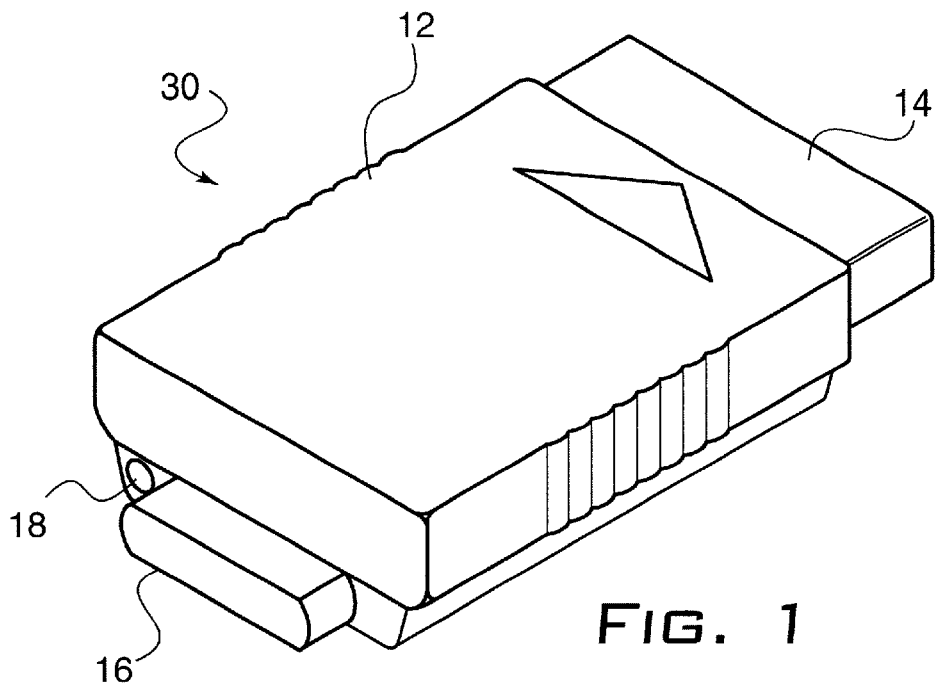
FIG. 1 is a perspective view of the wireless adapter device according to a first embodiment of the invention.
Figure 2A:
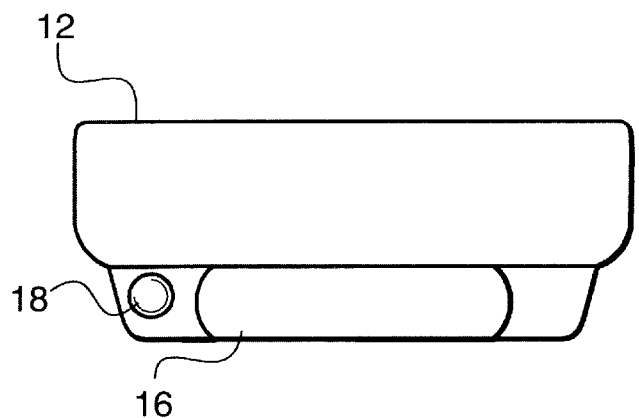
FIG. 2a is a front view of the wireless adapter device according to the first embodiment of the invention.
Figure 2B:
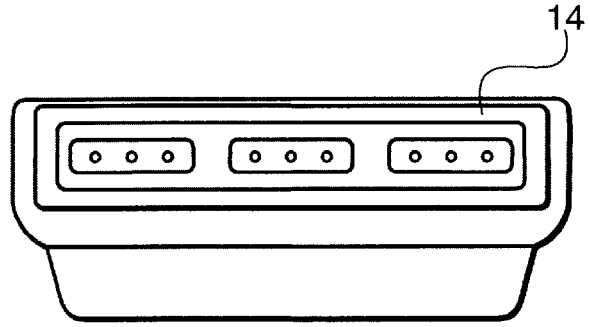
FIG. 2b is a rear view of the wireless adapter device according to the first embodiment of the invention.

Referring to FIGS. 1, 2a and 2b, there is shown a wireless adapter/receiver 10 according to a first embodiment of the present invention. Adapter 10 includes a body 12, a male plug 14 on one end for connection to a game controller port of a game console (not shown) and an infrared (IR) receiver 16 opposite plug 14. An indicator light 18 is included for indicating when IR receiver 16 is receiving an IR transmission from an IR transmitter (discussed with reference to FIG. 5).

Adapter 10 converts the game controller port of a video game console into an IR receiver capable of receiving and inputting control commands into the game console. In accordance with the present invention, the adapter/receiver 10 receives the wireless signals from the remote control 50 (FIG. 5) and converts the wireless signals into electrical signals for input into the game console. In accordance with the preferred embodiment, the wirelessly transmitted and received control commands are exclusively the commands necessary to control the DVD functions of the game console. Adapter/receiver 10 uses one game controller port (not shown) of the game console (not shown). As such, when adapter/receiver 10 is in its operable position within the game controller port, the used game controller port is no longer available for use with a game controller.

The game console capable of playing other entertainment media such as DVDs and audio compact discs (e.g., Sony PLAYSTATION II®) also includes various other external ports such as universal serial bus (USB) ports, a FireWire™ port and also includes a PCMCIA slot for receiving a PCMCIA card. It is contemplated herein that any one of these additional ports or PCMCIA slot may also be used to provide the necessary interface for a wireless controller. For example, one of the two (2) USB ports may be used to connect a wireless adapter that is capable of receiving and providing control data to the game console and thereby control the various game playing and other media playing features associated with the game console. The use of a PCMCIA card adapted to provide a wireless interface with the game console may also be readily implemented in this manner. The FireWire™ port of the game console is a dedicated high bandwidth port that provides an increased capacity data communication port for data streaming into and out of the game console. This port can provide a very fast and reliable communication connection with the game console, and as such, is also a prime candidate for receiving a wireless adaptor as suggested by the present invention.

Figure 5:
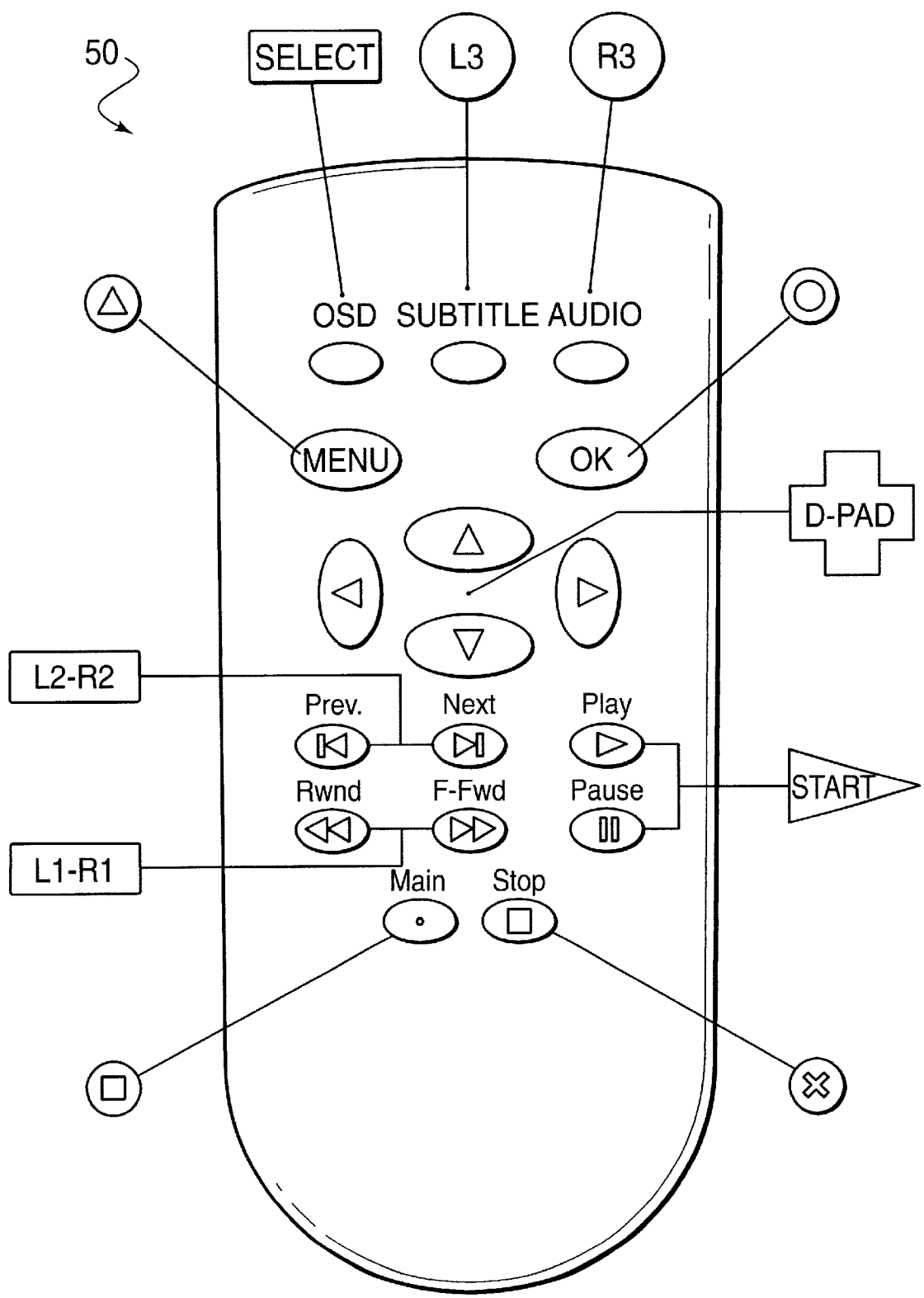
FIG. 5 is an embodiment of the dedicated wireless DVD controller for use with the game console wireless adapter according to the present invention.

Since the game console is designed to use a game controller as the DVD controller, the buttons on the game controller corresponding to the DVD player functions have game controller symbols and not DVD player symbols. In this configuration, the user is required to identify the various game controller buttons according to their DVD functions, either through the use of a printed chart, or through navigable menus on the display screen. This is not only inconvenient for the user, but is also confusing. As shown in FIG. 5, the dedicated DVD controller 50 of the present invention provides the user with a standard type DVD player remote control, where the game controller symbols are no longer visible to the user, and the corresponding buttons for activating DVD player functions are similar, if not identical, to those buttons the user would ordinarily associate with the DVD player functions. The buttons of the dedicated DVD controller 50 have identifying indicia representative of the corresponding function, in addition to including indicia disposed adjacent the buttons where appropriate. By way of example, these functions include play, pause, on screen display (osd), stop/exit, main menu, DVD menu, confirm/accept/ok, back to previous chapter, skip to next chapter, rewind, fast forward, toggle subtitles, toggle sound options, and a D-pad for use in navigating menus, etc.

In accordance with the present invention, controller 50 is a wireless infrared transmitter capable of transmitting only those predetermined game controller commands that control the various DVD player functions of the game console. Since the game console can also play audio CDs, those media playing functions may also be controlled by the dedicated remote control 50 according to the invention. Table 1 represents one embodiment of the button configuration of controller 50 as they correspond to the game controller buttons (and corresponding button symbols) that would be found on the wired game controller. Those of ordinary skill will recognize that the dedicated DVD controller button designations may be changed without departing from the spirit of the present invention.

TABLE 1

| Wired Game Controller button symbol | Dedicated Wireless DVD controller button |
|---|---|
| Start | Play and Pause |
| Select | On Screen Display (OSD) |
| X-button | Stop/Exit |
| Square Button | Main Menu |
| Triangle | DVD Menu |
| Circle | Confirm/Accept/OK |
| L1-Button | Back to Previous Chapter |
| L2-Button | Rewind |
| L3-Button | Toggle Subtitles |
| R1-Button | Skip to Next Chapter |
| R2-Button | Fast Forward |
| R3-Button | Toggle Sound Options |
| 'D'-Pad | Cycle through on screen menus |

When wireless adapter/receiver 10 is inserted into the game controller port of the game console, it is adapted to receive only DVD player function control signals from controller 50, and thereby input such commands directly into the game console. Adapter 10 and controller 50 are not adapted to be used for any game playing functions of the game console. The power provided to controller 50 is generally provided by replaceable batteries, and the power needed to operate adapter 10 is provided either from the game console itself through the game controller port, or through replaceable batteries as well.

Figure 3:
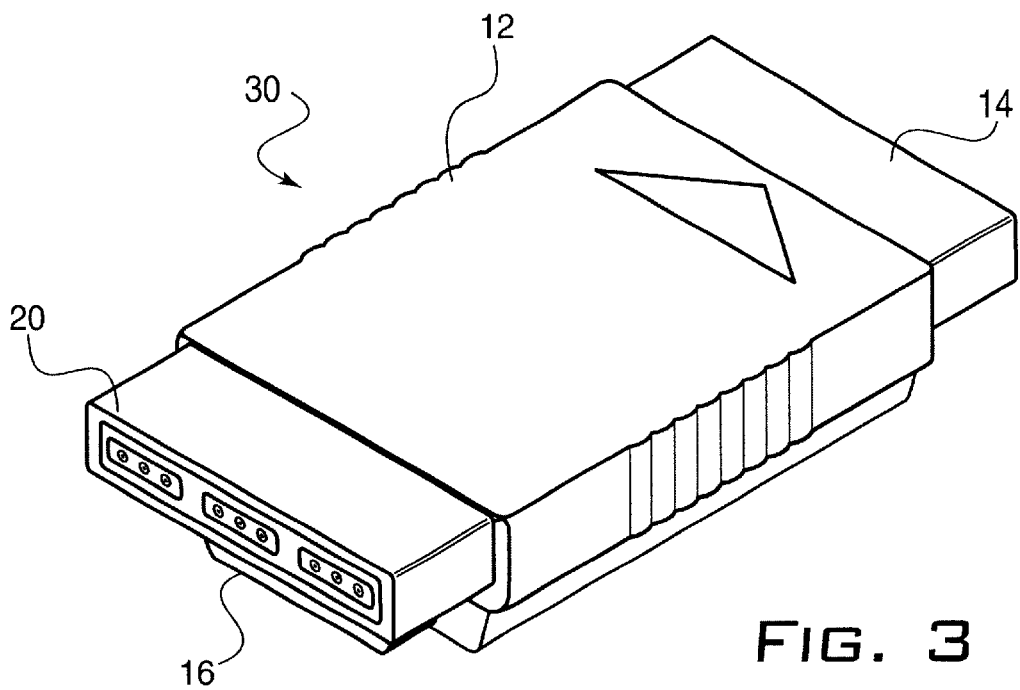
FIG. 3 is a perspective view of the game console wireless adapter device according to a second embodiment of the invention.
Figure 4A:
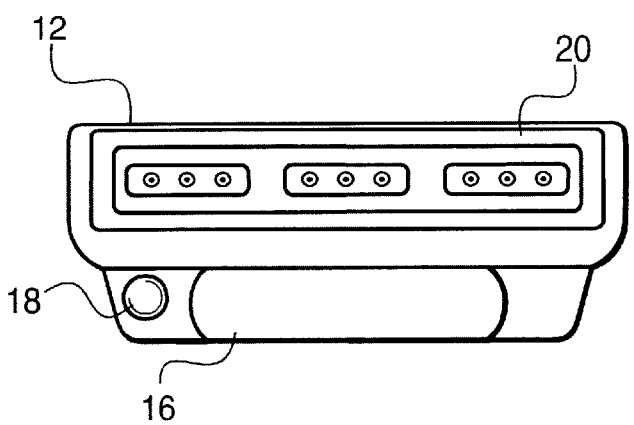
FIG. 4a is a front view of the wireless adapter device according to the second embodiment of the invention.
Figure 4B:
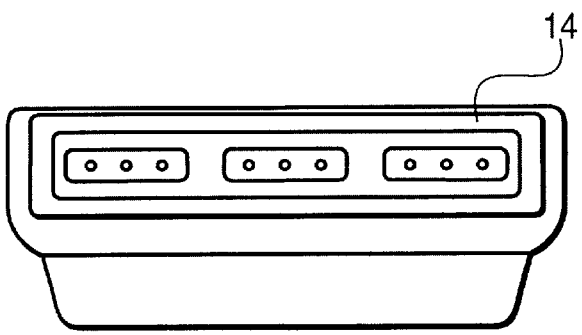
FIG. 4b is a rear view of the wireless adapter device according to the second embodiment of the invention.

FIGS. 3, 4a and 4b show a wireless adapter 30 according to a second embodiment of the invention. In this embodiment, adapter 30 includes an additional female game controller port 20. As described with reference to the first embodiment, male plug 14 is inserted into the game controller port of the game console. The added female game controller port 20 allows the wired game controller (not shown) to be plugged into the adapter while maintaining the IR communication between the adapter and the dedicated DVD controller.

It is to be understood that the use of IR wireless protocol as described herein is only one exemplary embodiment, and those of ordinary skill will recognize that other wireless protocol may be used such as, for example, radio frequencies (RF) as disclosed in U.S. Pat. No. 5,806,849, which is incorporated herein by reference.

The video game console is capable of detecting the type of disc inserted and automatically switch into that operating mode. For example, when a DVD is inserted into the game console, the game console automatically switches to DVD player mode and stands by for input DVD playing control commands from the game controller port. Thus, there is no requirement by the user to set the game console into DVD mode, or otherwise. Upon insertion of a DVD, the dedicated DVD controller of the present invention becomes immediately live and active for use in controlling the DVD functions of the game console.

In a further embodiment of the invention, remote control 50 will be a programmable remote control so that it may also be used to control specified components of the user's entertainment system. Thus, additional buttons and functions such as volume control, power control, etc. can be added to remote 50 without departing from the scope of the present invention. Examples of these programmable features can be found in U.S. Pat. Nos. 5,969,774 and 5,410,326, both of which are incorporated herein by reference.

While there have shown and described and pointed out fundamental novel features of the invention as applied to preferred embodiments thereof, it will be understood that various omissions, substitutions, changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A wireless controller for controlling digital video disc (DVD) functions of a video game console capable of playing DVDs, the game console having game controller ports for receiving game controllers, the wireless controller comprising:
   a wireless receiver having one end insertable into at least one of the game controller ports of the video game console and a wireless receiving portion; and
   a dedicated DVD remote control transmitter having an absence of control over game functions of the video game console at all times and having a plurality of DVD player function control buttons, said remote control wirelessly transmitting DVD player control commands to said receiver for controlling the DVD player functions of the video game console.

2. The wireless controller in accordance with claim 1, further comprising an infrared wireless protocol for the wireless transmitting and receiving of the DVD player control commands from said remote control to said wireless receiver.

3. The wireless controller in accordance with claim 1, further comprising a radio frequency protocol for the wireless transmitting and receiving of the DVD player control commands from said remote control to said wireless receiver.

4. The wireless controller in accordance with claim 1, wherein said wireless receiver further comprises an indicator light for providing a user with a visual indication when said dedicated DVD remote control is actively transmitting DVD player control functions to said receiver.

5. The wireless controller in accordance with claim 1, wherein said wireless receiver further comprises a game controller receiving port adapted to receive a game controller while said wireless receiver is operably positioned within the game controller port of the video game console.

6. The wireless controller in accordance with claim 1, wherein the plurality of DVD player function control buttons correspond in function to predetermined buttons on the game controller designated for controlling the DVD player functions of the video console.

7. The wireless controller in accordance with claim 6, wherein each of said plurality of DVD player function control buttons comprise indicia representative of the corresponding DVD player function associated with the respective button.

8. A wireless controller for a game console, the game console having controller ports and two modes including (i) a first game mode capable of playing video games and (ii) a second entertainment mode capable of playing DVD videos, and a game controller coupled to at least one of the controller port and configured to operate said game console in said first game mode, said wireless controller controlling the game console when in the second entertainment mode, the wireless controller comprising:
   a wireless receiver having one end insertable into one of the controller port of the video game console and a wireless receiving portion;
   a dedicated DVD remote control transmitter having an absence of control over game functions of the video game console at all times and in all modes and having a plurality of DVD player function control buttons, said remote control wirelessly transmitting DVD player control commands to said receiver for controlling the DVD player functions of the video game console when in said second entertainment mode; and
   a wireless communication protocol for transmitting and receiving of the DVD player control commands from said remote control to said receiver, said wireless receiver converting received wireless DVD player control commands into electrical signals for input into a controller port of the video game console.

9. The wireless controller according with claim 8, wherein said wireless communication protocol comprises infrared (IR).

10. The wireless controller according with claim 8, wherein said wireless communication protocol comprises radio frequencies (RF).

11. The wireless controller according to claim 8, wherein the plurality of DVD player function control buttons correspond in function to predetermined buttons on the game controller designated for controlling the DVD player functions of the video console.

12. The wireless controller in accordance with claim 11, wherein each of said plurality of DVD player function control buttons comprise indicia representative of the corresponding DVD player function associated with the respective button.

13. The wireless controlled in accordance with claim 8, wherein said wireless receiver further comprises a game controller receiving port adapted to receive a game controller while said wireless receiver is operably positioned within the game controller port of the video game console.

14. A video game and audio/video entertainment system coupled to a television monitor comprising:
   a game console having a controller port and two modes comprising (i) a first game mode capable of playing video games and (ii) a second entertainment mode capable of playing DVD videos;
   a game controller coupled to said controller port and configured to operate said game console in said first game mode; and
   a wireless adapter and a dedicated DVD video remote control configured to operate said game console via wireless transmissions to said wireless adapter, whereby upon coupling said wireless adapter to said controller port in place of said game controller, said dedicated DVD video remote control exclusively operates said game console in said second entertainment mode, and
   wherein said dedicated DVD video remote control has an absence of control over game functions of the video game console at all times and in all of said operation modes.

15. The system according to claim 14, wherein said dedicated DVD video remote control comprises DVD player controls and a substantially flat panel in which all of said player controls are mounted.

16. The system according to claim 15, wherein said flat panel is devoid of game playing indicia.

* * * * *